Nov. 9, 1926.
R. A. GROSS
FLYTRAP AND BLANK THEREFOR
Filed Dec. 17, 1925  2 Sheets-Sheet 1
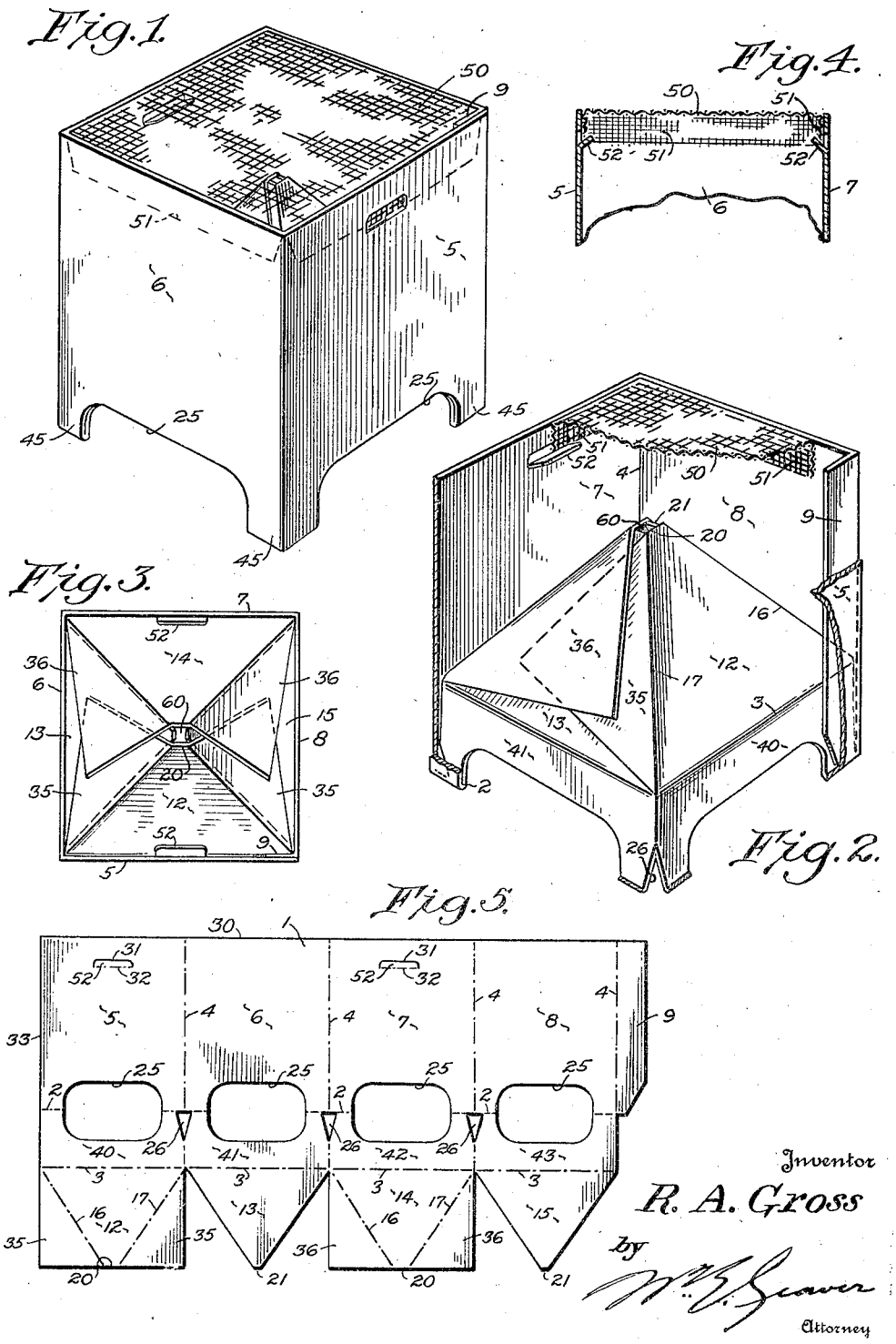

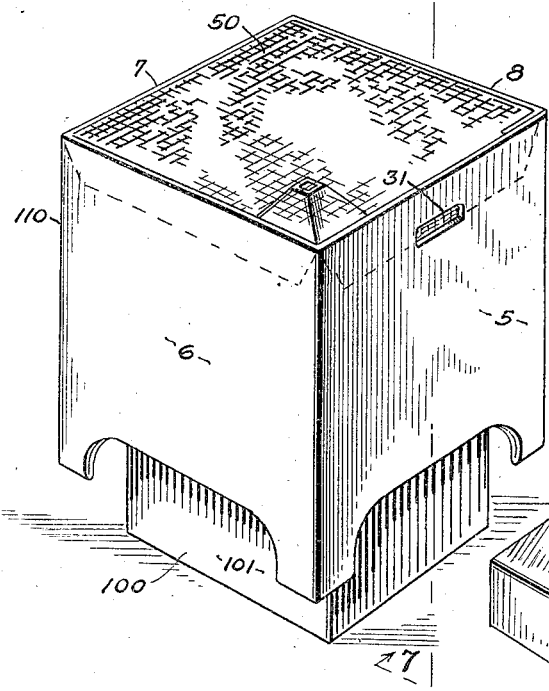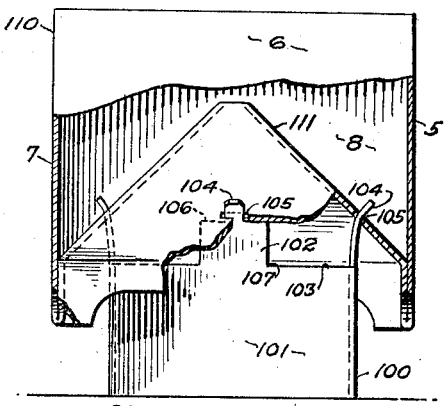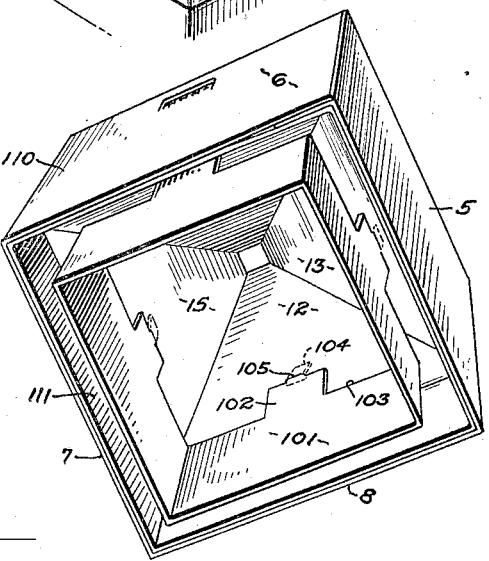

Patented Nov. 9, 1926.

1,606,568

UNITED STATES PATENT OFFICE.

RALPH A. GROSS, OF LITITZ, PENNSYLVANIA, ASSIGNOR TO LITITZ PAPER BOX & PRINTING COMPANY, OF LITITZ, PENNSYLVANIA, A CORPORATION OF PENNSYLVANIA.

FLYTRAP AND BLANK THEREFOR.

Application filed December 17, 1925. Serial No. 76,010.

This invention relates to fly traps and has for its object to provide a construction more efficient in use and less costly in manufacture than those heretofore proposed.

With these and other objects in view, the invention resides in the novel details of construction and arrangements of parts as will be more fully hereinafter disclosed and particularly pointed out in the claims.

Referring to the drawings, forming a part of this specification, in which like numerals designate like parts in all the views:—

Fig. 1 is a perspective view of the assembled fly trap;

Fig. 2 is a view similar to Fig. 1, with parts broken away, to show the interior construction;

Fig. 3 is a top plan view of the receptacle forming the fly trap with the screen cover portion removed;

Fig. 4 is a sectional view showing the supporting means of the screen cover for the trap;

Fig. 5 is a development, or plan view, of the paper blank from which the receptacle is formed;

Fig. 6 is a perspective view of a modified form of fly trap;

Fig. 7 is a sectional view taken on the line 7—7 of Fig. 6 and looking in the direction of the arrows;

Fig. 8 is a partial sectional view illustrating the method of assembling the trap shown in Fig. 6;

Fig. 9 is a bottom perspective view of a still further modified form of the trap shown in Fig. 1; and Fig. 10 is a partial perspective view of a modified form of cone for use with the traps shown in Figs. 1 and 6.

The receptacle proper is formed from a blank 1 of sheet material substantially rectangular in shape and provided with the longitudinally disposed, spaced score lines 2 and 3, parallel to each other and parallel to the longer side of the blank 1. Score lines 4, at right angles to the score lines 2 and 3, and parallel to the shorter sides of the blank 1 are so transversely disposed as to divide the blank 1 into four panels 5, 6, 7 and 8, which ultimately form the four sides of the receptacle, leaving a narrow tab portion 9 by means of which the receptacle is fastened together in rectangular formation. Along the score line 3 and extending away from the main body portion of the blank 1 are tongues or extensions 12, 13, 14 and 15, so disposed that 12 is in prolongation of the side 5, tongue 13 is in prolongation of side 6, and extensions 14 and 15 are respectively in prolongation of the sides 7 and 8. The extensions 12 and 14 are rectangular in shape, whereas the extensions 13 and 15 are triangular in shape as clearly disclosed in Fig. 5. The extensions 12 and 14 are provided with score lines 16 substantially parallel with one edge of the triangular tongues 13 and 15, while score lines 17 are provided on said first mentioned extensions substantially parallel to the other oblique edge of the said tongues 13 and 15. The oblique score lines 16 and 17, as will be noted, do not meet in the outer edge of the extensions 12 and 14, but are so disposed as to leave a portion 20 of the extreme outer edge of said extensions for a purpose that will be presently disclosed. Likewise, the triangular tongues 13 and 15 are provided with a blunt or cut-off extremity 21 adapted to co-operate with the portion 20 on the extensions 12 and 14. The blank 1 is provided with the plurality of apertures 25, one for each of the four sides of the receptacle, and disposed so that the score line 2 will bisect said apertures. Said blank 1 is further provided with a plurality of triangular apertures 26 with their bases on the score line 2 and their apices on the score line 4. Near the edge 30 of the blank 1 and equidistant from the sides of the panels 5 and 7, are two inverted U-shaped incisions or slits 31 having the score lines 32 connecting the points or ends of the said slit 31.

In folding the blank 1 to produce the receptacle, the extensions 12, 13, 14 and 15 are raised and bent over onto the main body portion of the blank 1 along the score line 2. Then the once folded blank is bent along the score line 4 and the tab 9 secured by any suitable adhesive along the edge 33 of the side 5 of the receptacle and on the inside thereof. The triangular corners or flaps 35 of the extension 12 are then bent as clearly shown in the drawings and secured by any suitable adhesive to the adjacent portions of the triangular tongues 13 and 15. In like manner, the triangular corners or flaps 36 of the extension 14 are then bent similarly and secured by adhesive or other suitable medium to their adjacent portions of the triangular tongues 13 and 15, and to the triangular corners 35 of the extension 12, see Figs. 2 and 3 particularly.

Thus there is produced a paper receptacle of substantially rectangular formation provided with an upwardly inclined pyramidal shaped bottom formed by the extensions 12, 13, 14 and 15. If desired, the portions 40, 41, 42 and 43 adjacent the extensions 12, 13, 14 and 15, may be secured by adhesive material to the main body portion of the sides 5, 6, 7 and 8 when the blank is first bent along the score line 2 in order to insure a more sturdy construction. From Fig. 1, it will readily be seen that the apertures 25 create cut-away portions in the lower part of the receptacle of pleasing lines, to produce the feet or standards generally indicated at 45.

In order to form the fly trap from this paper or cardboard receptacle, that portion of the diametrically opposite sides 5 and 7 included within the incision 31, is bent inwardly along the score lines 32 as clearly seen in Fig. 3, and a top 50 of any suitable reticulate material such as wire gauze or netting provided with depending flanges 51 is inserted within the top of the receptacle and pressed downwardly onto the internally extended tongues 52 provided by the slits 31. The top 50 is thus held in substantially rigid position in the receptacle, thus affording maximum cage space within the receptacle for any flies or other insects that may enter therein.

In order to attract and kill the flies or other insects, the inside of the receptacle, and especially the pyramidal bottom thereof, may be treated with molasses or any other suitable non-drying sticky substance admixed with quassia chip compound or other suitable poison.

The operation of the trap will be apparent from the drawings but may be briefly stated as follows:—The trap having been assembled as above described, the same is set up on its legs 45 on a flat surface, whereupon flies or other insects may crawl through that portion of the apertures 25 included between said legs, crawl up the bottom or concaved side walls of the pyramidal bottom, through the rectangularly shaped aperture 60, see Figs. 2 and 3, and thus gain admittance to the inside of the trap. The rectangular aperture 60 is formed as will be readily seen from Figs. 3 and 5, by the cut-off ends 21 of the triangular tongues 13 and 15, and the straight portions 20 between the score lines 16 and 17 of the extensions 12 and 14. As is well known, once the fly or other insect has gained access to the interior of the trap, the small opening 60 being elevated, or at the highest points of the pyramidal bottom surfaces of the trap, prevents the egress of the insect from the trap.

In the modified form of the invention shown in Figs. 6, 7 and 8, the main body portion of the trap is in all respects made similar to the trap illustrated in Fig. 1. That is to say, there are the sides 5, 6, 7 and 8 and the cone shaped bottom member comprising the surfaces 12, 13, 14 and 15. However, the modified form of the invention is considered an improvement and therefore to be preferred over the form illustrated in Fig. 1 because it has been found, that a fly crawling upon the article supporting the trap shown in Fig. 1 may pass entirely underneath said trap through the openings 25. In other words, a fly can crawl through one opening 25 and traverse the surface of the object supporting the trap and pass under and through any one of the other openings 25 without necessarily going upwards and through the aperture 60 in the cone shaped bottom member with which the trap is provided.

Therefore, in the modified form of the invention there is provided a rectangularly shaped supporting member generally indicated by the numeral 100, the sides of which extend to the surface upon which the trap is supported. Each side of this supporting member 100, such as the side 101, see Fig 7, is provided with a tongue extending upwardly from the top edge 103 of said side, and each tongue 102 has a tab 104 adapted to enter a slit 105 provided in each of the surfaces 12, 13, 14 and 15 of the cone shaped bottom of the trap, as clearly disclosed in the drawings. In other words, each of the tongues 102 are of the same length, and are disposed midway of each side 101, and further each tab 104 is centrally located with respect to the tongues 102. Therefore, the entire trap proper, generally indicated by the numeral 110 is evenly supported by the readily detachable rectangular supporting member 100.

Further, the tab 104 is of such size and dimension as to provide a shoulder 106 on either side of said tab which is adapted to engage the under side of the cone shaped bottom member generally indicated by the numeral 111. Also each tongue 102 forms with each side 101 of the base supporting member an angle generally indicated at 107 on each side of said tongue. The purpose of this construction is to form a space or passage between the upper edge 103 of each side 101, and the corresponding and associated member of the cone shaped base 111. Thus a fly crawling upon the surface of an object supporting the trap will reach the vertically disposed wall such as 101 of the base member 100 and, according to custom, will crawl upward on said wall until the top edge 103 thereof is reached. The fly will then either jump from said edge to the under surface of the cone shaped bottom member 111, or will crawl along said edge to such a tongue as 102, and then crawl up on said tongue until the under side of said cone member is reached. The fly, now on the under side of said cone member, will crawl upwards on said surface and eventually pass through the aperture 60 at the apex of said cone and thus be caught within the trap 110.

In Fig. 10 is disclosed a modification of the cone member 111 from which it will be observed that the upper portion of said cone is cut away and supplied with a cone 120 of suitable material such as screening, etc., in order to admit more light to the cone chamber and therefore better attract a fly to the aperture 121 in the top of said cone 120. Said screen cone 121 may be supported in any suitable manner, and is illustrated as supported by inturned tabs 122 similar to the tabs 52 supporting the cover 50 shown in Fig. 2.

In Fig. 9 is illustrated a still further modified form of the invention wherein the cone shaped bottom member 111 is not formed integrally with the sides of the trap 110 but is secured thereto in any suitable manner such as by glue, staples, etc. In all other respects the complete trap as shown in Fig. 9 is identical with the trap shown in Fig. 6.

These traps may be made from colored, or ornamental surfaced pasteboard so that the said traps may be supplied in different tones or designs, not only pleasing to the eye, but which may be selected with a view to harmonizing with the wall paper or other furnishings of a room in which said trap is to be placed. On the other hand, it is also possible that these traps may be made from perfectly blank or clear cardboard and that the sides 5, 6, 7 and 8 may have exteriorly thereof any printed legend, advertising, or other matter, as desired.

From the foregoing, it will therefore be seen that there is disclosed herein a blank for a receptacle which comprises a substantially rectangular sheet of material provided with a plurality of transversely disposed spaced score lines 4, as well as two longitudinally disposed spaced parallel score lines, 2 and 3, intersecting said first named score lines 4 at right angles. This blank 1 is further provided with a plurality of apertures 25 associated with one of the longitudinally disposed score lines, namely, 2, to provide legs 45 for said receptacle when said sheet is folded on the score line 2 and the transverse score lines 4. There is also provided in this blank 1 a plurality of triangularly shaped apertures 26, one associated with each transverse score line 4, and all of said apertures 26 associated with the longitudinal score line 2, said apertures 26 constituting a means to prevent the breaking of the outer walls 5, 6, 7 and 8, when they are folded on the score lines 4 to form the said receptacle. This will be obvious from the fact that there is but one thickness of material at the bottom corners of the legs 45, see Fig. 2. Also, it will be observed that this blank 1 is provided with a plurality of substantially equilateral and triangularly shaped extensions 13 and 15, as well as a plurality of rectangularly shaped extensions 12 and 14 disposed intermediate said triangular extensions, and that all of said extensions 12, 13, 14 and 15, are separated from the main body portion of the blank 1, as by the score line 3. Further, there are provided a plurality of score lines 16 and 17 on each rectangular extension 12 and 14 which are obliquely disposed to each other and associated with the longitudinal score line 3 to provide triangularly shaped sections similar to the triangular extensions 13 and 14. These oblique score lines 16 and 17 further provide the sealing flaps 35 and 36, as will be clear from Fig. 5 of the drawings. The tab 9 at the end of the blank 1 is for the purpose of securing the folded receptacle, and is separated from the main body portion of the blank 1, as by a shorter transverse score line 4.

Stated in other words, this blank when folded into a receptacle and secured in folded position, constitutes a receptacle having a plurality of outer walls 5, 6, 7 and 8, an inner wall comprising the portions 40, 41, 42 and 43, integral with the outer wall material and rigidly secured in folded position thereto by any suitable adhesive. There is also provided a pyramidal shaped bottom for the receptacle having a square centrally disposed aperture, said bottom formed by inwardly projecting extensions 12, 13, 14 and 15 of the inner wall portions 40, 41, 42 and 43, and all of these extensions adapted to be rigidly secured together by any suitable adhesive. It will be obvious from the drawings that the inner wall when folded against the outer wall, provides the legs 45 separated by the arches of the apertures 25.

It is obvious that those skilled in the art may vary the details of construction as well as the arrangements of parts without departing from the spirit of the invention, and therefore it is not desired to be limited to the above exact disclosure except as may be demanded by the claims.

What is claimed is:

1. A blank for a receptacle, the same comprising a substantially rectangular sheet of material provided with a plurality of transversely disposed spaced score lines parallel to one edge of said sheet; two longitudinally disposed spaced parallel score lines intersecting said first named score lines at right angles; a plurality of apertures associated with one of said longitudinally disposed score lines to provide legs for said receptacle when said sheet is folded on said last named score line and said transverse score lines; a plurality of triangularly shaped apertures, one associated with each transverse score line, and all of said last named apertures associated with said one of said longitudinally disposed score lines, said triangular apertures to prevent breakage of the sheet when folded to form said receptacle; a plurality of substantially equilateral and triangularly shaped extensions; a plurality of rectangularly shaped extensions disposed intermediate said triangular extensions, all of said extensions associated with the other of said longitudinally disposed score lines, and each extension associated with that portion of the sheet included between said transverse score lines and the edges of the sheet parallel therewith to form an upwardly and tapering inclined portion of the bottom of the folded receptacle; a plurality of score lines on each rectangular extension obliquely disposed to each other and associated with said other of said longitudinally disposed score lines to provide a triangular section similar to said triangular extensions as well as a plurality of sealing flaps; a tab disposed at one end of said sheet adapted to secure said receptacle in transversely folded position; and a score line parallel to said transversely disposed score lines and associated with said tab.

2. In a receptacle, the combination of a plurality of vertical outer walls; an inner wall integral with each of said outer walls and rigidly secured thereto; and a pyramidal shaped bottom whose lower edges lie within and integral with said inner walls.

3. In a receptacle the combination of a plurality of vertical outer walls; an inner wall integral with and rigidly secured to each of said outer walls and adapted to form therewith a plurality of legs for said receptacle; and a pyramidal shaped bottom whose lower edges lie within and integral with said inner walls.

4. In a receptacle the combination of a plurality of vertical outer walls; an inner wall integral with and rigidly secured to each of said outer walls; and an inwardly projecting extension of each inner wall, all of said extensions rigidly secured together to form a pyramidal shaped bottom.

5. In a trap for flies and other insects comprising a folded blank of sheet material, the combination of an outer wall; an inner wall integral with said outer wall and associated rigidly therewith to form a plurality of legs for said trap; extensions integral with said inner wall and rigidy secured together to provide an inwardly projecting pyramidal bottom having a central aperture for the entrance of said flies; and a reticulate cover tightly fitting the top of said outer wall.

6. In a trap for flies and other insects comprising a folded blank of sheet material, the combination of an outer wall provided with integrally formed inwardly extending tongues; an inner wall integral with said outer wall and associated rigidly therewith to form a plurality of legs for said trap; extensions integral with said inner wall and rigidly secured together to provide an inwardly projecting pyramidal bottom having a central aperture for the entrance of said flies; and a reticulate cover tightly fitting the top of said outer wall and supported by said tongues.

7. In a trap for flies and other insects comprising a folded blank of sheet material, the combination of an outer wall; an inner wall integral with said outer wall and associated rigidly therewith to form a plurality of legs for said trap; means in said inner wall to prevent breaking of the outer wall when bent around said inner wall; extensions integral with said inner wall and rigidly secured together to provide an inwardly projecting pyramidal bottom having a central aperture for the entrance of said flies; and a reticulate cover tightly fitting the top of said outer wall.

8. In a receptacle the combination of a plurality of outer walls; an inner wall integral with and rigidly secured to each of said outer walls; a pyramidal shaped bottom integral with said inner walls; and supporting means for said receptacle carried by said bottom in spaced relation to said walls.

9. In a receptacle the combination of a plurality of outer walls; an inner wall integral with each of said outer walls; a pyramidal shaped bottom integral with said inner walls; and supporting means readily detachable from said bottom and held in spaced relation from said inner walls and said bottom to provide a passage.

10. In a trap for flies and other insects comprising a folded blank of sheet material, the combination of an outer wall; an inner wall integral with said outer wall and associated rigidly therewith; extensions integral with said inner wall and rigidly secured together to provide an inwardly projecting pyramidal bottom having a central aperture for the entrance of said flies; means associated with said bottom for supporting said trap; and a reticulate cover tightly fitting the top of said outer wall.

11. In a trap for flies and other insects comprising a folded blank of sheet material, the combination of an outer wall; an inner wall integral with said outer wall and associated rigidly therewith; extensions integral with said inner wall and rigidly secured together to provide an inwardly projecting pyramidal bottom having a central aperture for the entrance of said flies; means associated with said bottom and held in spaced relation thereto for supporting said trap; and a reticulate cover tightly fitting the top of said outer wall.

In testimony whereof I affix my signature.

RALPH A. GROSS.